A. C. HOPKINS.
ROLLER JACK FOR VEHICLES.
APPLICATION FILED SEPT. 14, 1917.

1,280,472.

Patented Oct. 1, 1918.

Inventor

Arthur C. Hopkins,

By Hiram A. Sturges,

Attorney

UNITED STATES PATENT OFFICE.

ARTHUR C. HOPKINS, OF SIOUX FALLS, SOUTH DAKOTA, ASSIGNOR TO MID-WEST MANUFACTURING COMPANY, OF SIOUX FALLS, SOUTH DAKOTA, A CORPORATION.

ROLLER-JACK FOR VEHICLES.

1,280,472.

Specification of Letters Patent.

Patented Oct. 1, 1918.

Application filed September 14, 1917. Serial No. 191,343.

*To all whom it may concern:*

Be it known that I, ARTHUR C. HOPKINS, a citizen of the United States, residing at Sioux Falls, in the county of Minnehaha and State of South Dakota, have invented certain new and useful Improvements in Roller-Jacks for Vehicles, of which the following is a specification.

This invention relates to an improvement in roller jacks particularly useful for elevating the axles of motor trucks or similar vehicles, and has for its object to provide a construction suitable for lifting heavier loads than usual, and to have the operative parts so disposed that they will not obtrude in a manner to hinder or interfere materially with workmen at or about the vehicle, and may be operated at, comparatively, a remote distance from the axle.

The novel features of the invention will be fully described herein and claimed, and are illustrated in the accompanying drawing, wherein,—

Figure 1:
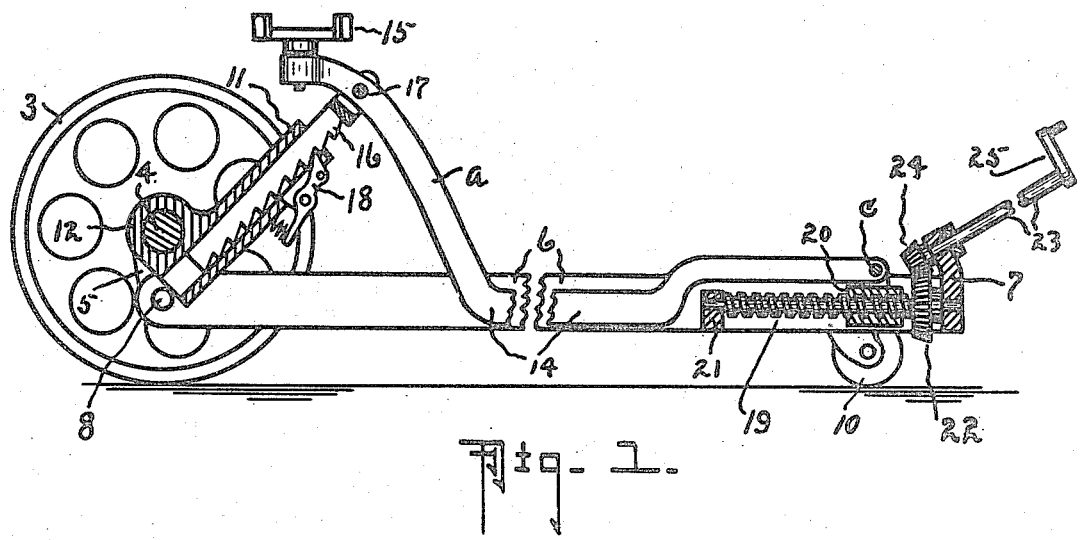
Figure 2:
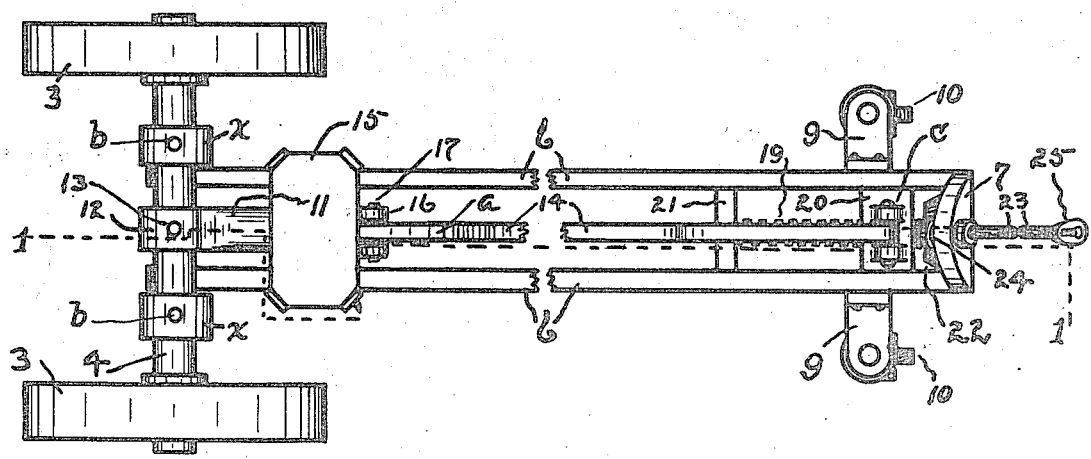

Figure 1 is a view in longitudinal section on line 1—1 of Fig. 2. Fig. 2 is a broken away plan of a roller jack embodying my invention.

In the drawing, numerals 3 and 4 respectively indicate the wheels and axle of a two-wheeled truck, the axle being provided on its lower side with a pair of cranks or levers 5 disposed equi-distant from the wheels, said levers each being provided with a boss $x$ for a mounting upon the axle.

A tongue-member, frame or second truck is provided, consisting of the pair of side-bars 6 having a connecting-member or upwardly projecting boss 7 at their front ends, their rear ends being pivotally mounted, as indicated at 8, upon the cranks or levers 5 of the axle, each side-bar 6 being provided, near its front end, with a bracket 9 for a mounting of a caster 10, the pivotal mountings 8, being of strong construction to adequately resist stresses.

At 11 is indicated a sleeve, housing or standard provided with a boss 12, and by means of a pin 13 it is secured to the axle. Numeral 14 indicates an operating-bar provided at its inner end with a load-engaging member or swivel-cap 15, said bar having an upwardly projecting part $a$ adjacent to its inner end.

Numeral 16 indicates a supporting-bar which is disposed within the sleeve, this member preferably being a rack-bar, its outer end being pivotally connected, as indicated at 17, with the upwardly projecting part $a$ of the operating-bar; and by means of a pawl 18, which is mounted upon the sleeve 11, a downward slidable movement of the rack-bar within the sleeve, will normally be prevented.

The truck-wheels 3 are revolubly mounted on the axle, and it will be understood that while sustaining a load, if the operating-bar is moved inwardly or toward the wheels, the axle and wheels will adequately sustain the weight; also it will be understood that stress will be directed to the pivotal mountings 8, since the bosses $x$ of the cranks or levers 5 are rigidly secured to the axle by means of pins $b$ or equivalent means, the axle, in this respect, operating as a rockshaft and members 5 operating as levers.

In order that exceptionally heavy loads may be conveniently lifted, I provide a screw 19 having a threaded connection with a rider sleeve or slide-block 20 which is disposed between the side-bars, said screw having suitable bearings for its ends in a cross-bar 21 and the boss 7 of the side-bars, the operating-bar at its outer end being pivotally connected with the block 20, as indicated at $c$.

At 22 is indicated a miter gear with which the screw is provided, and by means of an operating-shaft 23 having bearings in the boss 7 and provided with a miter gear 24 engaging the miter gear 22, said shaft may be manually rotated by use of the crank 25.

The device may be conveniently moved about by an operator, who may cause the cap 15 to be disposed below an axle or other load to be elevated. By rotating the shaft 23 in one direction, the block 20 and operating-bar may be moved until the cap 15 is disposed in the vertical plane of the axle, if desired, the rack-bar moving in a circle's arc, the load, by this operation, being elevated; the distance to which the load will be elevated depending upon the adjustment of the pawl 18, since the distance between the pivotal mounting 17 of the rack-bar and the pivotal mountings 8 of the side-bars 6 may be increased or decreased by said adjustment.

Having fully described my invention, what I claim and desire to secure by Letters Patent is,—

1. In a roller-jack for vehicles, a truck, a frame having a threaded part and carried by the truck and provided with casters at its outer end, a screw in the threaded part of the frame, a slide-block engaging the screw, a sleeve mounted on the axle of the truck and provided with a pawl, a rack-bar in the sleeve engaged by the pawl, an operating-bar provided with a swivel-cap and pivotally connected with the rack-bar near one of its ends its opposite end being pivotally connected with the slide-block, said screw being revoluble to move the bar longitudinally for moving the rack-bar in a circle's arc.

2. In a roller-jack, a two-wheeled truck including an axle, a pair of rectilinear, parallel side-bars connected with the axle of the truck and provided with casters, a screw between the side-bars, a slide-block threaded on the screw, a sleeve mounted on the axle of the truck, a supporting-bar longitudinally adjustable in the sleeve an operating-bar between the side-bars and connected at its respective ends with the supporting-bar and slide-block, said screw being rotatable for moving the supporting-bar in a circle's arc.

3. In a roller jack, a truck including an axle, a pair of arms rigid with the axle, a pair of side-bars pivotally connected with said arms and provided with casters, a screw between the side-bars, a slide-block engaging the screw, a sleeve rigid with the axle and provided with a pawl, a rack-bar in the sleeve engaged by the pawl, an operating-bar provided with a swivel-cap and pivotally connected with the rack-bar near one of its ends its opposite end being pivotally connected with the slide-block, said screw being revoluble to move the bar longitudinally for moving the rack-bar in a circle's arc.

4. In a roller-jack, a truck including an axle, a pair of arms projecting downwardly from and rigidly mounted on the axle, a frame pivotally connected with the arms of the axle, a screw having bearings in the frame, a block threaded on the screw, a standard rigidly mounted on the axle, a supporting-bar carried by the standard, an operating-bar having a pivotal connection for its respective ends with the standard and said block, means to adjust the supporting-bar longitudinally of the standard, said screw being revoluble for moving the supporting-bar in a circle's arc.

5. In a roller jack for vehicles, a truck, a rectilinear frame having a threaded part and carried by the truck, a screw engaging in the threaded part of the frame, a block threaded on the screw, a standard mounted on the axle, a supporting-bar carried by the standard an operating-bar having an upwardly projecting part provided with a swivel-cap and pivotally connected with the supporting-bar near one of its ends its opposite end being pivotally connected with said block, said screw being revoluble to move the operating-bar longitudinally for moving the supporting-bar in a circle's arc.

6. In a roller jack, an axle provided with revolubly mounted wheels and having a projecting part, a standard rigid with the axle, a tongue pivotally connected with the projection of the axle, an operating-bar having a pivotal connection with the axle and means to actuate the operating-bar for moving the standard in a circle's arc.

7. In a roller jack, an axle provided with loosely mounted rollers and having a rigidly mounted downwardly projecting arm, a tongue-member having its inner end disposed below and adapted to have swinging movements with reference to the axle and having an upwardly projecting part at its outer end, a screw having bearings on the tongue-member and provided with a gear, a block threaded on the screw, a sleeve rigid with the axle, a supporting-bar in the sleeve, an operating-bar having an upwardly projecting part, said operating-bar being pivotally connected at its respective ends with the supporting-bar and said block, an operating-shaft having bearings in the upwardly projecting part of the tongue-member and provided with a gear engaging the gear of said screw, said operating-shaft being revoluble to actuate the operating-bar for moving the supporting-bar in a circle's arc.

In testimony whereof I have affixed my signature in presence of two witnesses.

ARTHUR C. HOPKINS.

Witnesses:
HIRAM A. STURGES,
C. E. IMES.